US010814401B2

(12) United States Patent
Fukuyama et al.

(10) Patent No.: US 10,814,401 B2
(45) Date of Patent: Oct. 27, 2020

(54) VIBRATION CUTTING INSERT

(71) Applicants: SUMITOMO ELECTRIC HARDMETAL CORP., Itami-shi (JP); CITIZEN MACHINERY CO., LTD., Kitasaku-gun (JP); CITIZEN WATCH CO., LTD., Nishitokyo-shi (JP)

(72) Inventors: Tomoyuki Fukuyama, Itami (JP); Kazuhiko Sannomiya, Kitasaku-gun (JP)

(73) Assignees: Sumitomo Electric Hardmetal Corp., Itami-shi (JP); Citizen Machinery Co., Ltd., Kitasaku-gun (JP); Citizen Watch Co., Ltd., Nishitokyo-shi (JP)

( * ) Notice: Subject to any disclaimer, the term of this patent is extended or adjusted under 35 U.S.C. 154(b) by 94 days.

(21) Appl. No.: 16/304,378

(22) PCT Filed: May 17, 2017

(86) PCT No.: PCT/JP2017/018467
§ 371 (c)(1),
(2) Date: Nov. 26, 2018

(87) PCT Pub. No.: WO2017/204045
PCT Pub. Date: Nov. 30, 2017

(65) Prior Publication Data
US 2019/0291188 A1    Sep. 26, 2019

(30) Foreign Application Priority Data

May 26, 2016  (JP) ................................ 2016-105470

(51) Int. Cl.
*B23B 27/22* (2006.01)
*B23B 27/14* (2006.01)
*B23B 1/00* (2006.01)

(52) U.S. Cl.
CPC .............. *B23B 27/141* (2013.01); *B23B 1/00* (2013.01); *B23B 27/22* (2013.01)

(58) Field of Classification Search
CPC ......... B23B 27/14; B23B 27/16; B23B 27/18; B23B 27/20; B23B 27/22; B23B 27/141;
(Continued)

(56) References Cited

U.S. PATENT DOCUMENTS 3,395,434 A * 8/1968 Wirfelt .................. B23B 27/143
407/114
4,993,892 A * 2/1991 Takahashi ............. B23B 27/065
407/114
(Continued)

FOREIGN PATENT DOCUMENTS

JP    60-146602 A    8/1985
JP    08-300207 A    11/1996
(Continued)

*Primary Examiner* — Nicole N Ramos
(74) *Attorney, Agent, or Firm* — Baker Botts L.L.P.; Michael A. Sartori

(57) ABSTRACT

A vibration cutting insert includes a top surface having a rake face and a breaker face, a first side surface, a second side surface, and a bottom surface. In a cross section which includes a bisector of an angle formed between a first ridgeline and a second ridgeline when viewed in a direction from the top surface toward the bottom surface, and which is parallel to the direction from the top surface toward the bottom surface, a rake angle formed between the rake face and a plane parallel to the bottom surface has a positive angle. The angle formed between the first ridgeline and the second ridgeline is an acute angle. The rake face constitutes a cylindrical surface. The breaker face constitutes a flat surface.

10 Claims, 5 Drawing Sheets

(58) Field of Classification Search
CPC ............ B23B 27/1613; B23B 27/1622; B23B 2200/0433; B23B 2200/083; B23B 2200/085; B23B 2200/286
See application file for complete search history.

(56) References Cited

U.S. PATENT DOCUMENTS

| | | | | |
|---|---|---|---|---|
| 5,044,839 | A | * | 9/1991 | Takahashi ............ B23B 27/143 407/114 |
| 5,215,415 | A | | 6/1993 | Fukuoka et al. |
| 5,456,557 | A | * | 10/1995 | Bernadic ............... B23B 27/143 407/114 |
| 5,911,802 | A | * | 6/1999 | Kimura .................. B23B 25/02 82/1.11 |
| 6,234,726 | B1 | * | 5/2001 | Okada .................. B23B 27/143 407/114 |
| 7,524,148 | B2 | * | 4/2009 | Okita .................... B23B 27/143 407/114 |
| 2012/0128438 | A1 | * | 5/2012 | Tanaka .................. B23B 27/141 407/115 |
| 2014/0102268 | A1 | * | 4/2014 | Hariki .................... B23B 27/22 82/118 |
| 2017/0102685 | A1 | * | 4/2017 | Kitakaze ................ G05B 19/19 |
| 2017/0108846 | A1 | | 4/2017 | Sannomiya et al. |
| 2019/0001455 | A1 | * | 1/2019 | Sannomiya .......... G05B 19/416 |

FOREIGN PATENT DOCUMENTS

| | | |
|---|---|---|
| JP | 2003-103407 A | 4/2003 |
| WO | 2015/146945 A1 | 10/2015 |

* cited by examiner

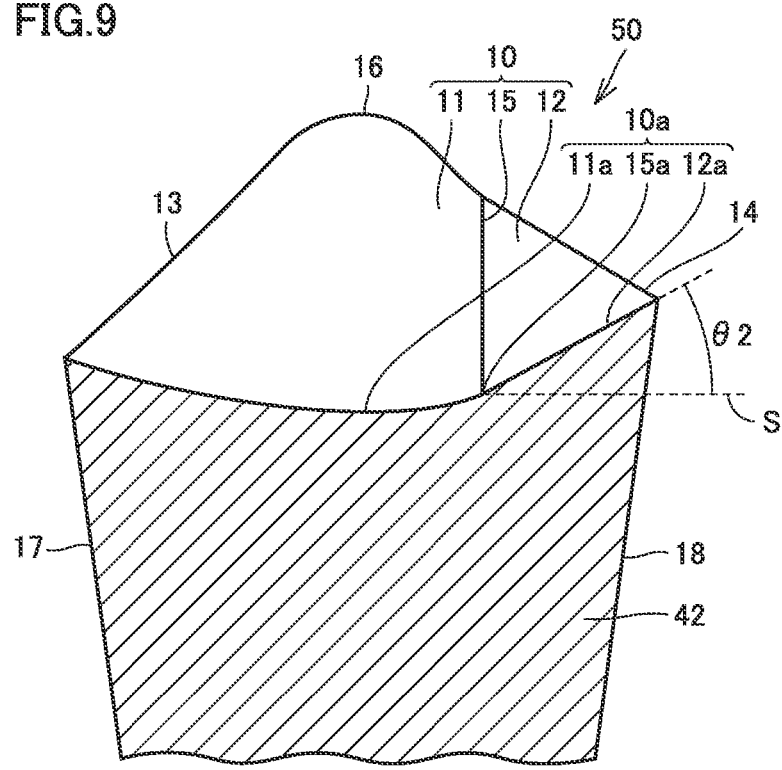

VIBRATION CUTTING INSERT

TECHNICAL FIELD

The present invention relates to a vibration cutting insert. The present application claims a priority based on Japanese Patent Application No. 2016-105470 filed on May 26, 2016, the entire content of which is incorporated herein by reference.

BACKGROUND ART

For example, Japanese Patent Laying-Open No. 2003-103407 (Patent Literature 1) discloses a cutting insert having a polygonal main surface. A rake face is formed in the main surface of the cutting insert, and a flank face is formed in a side surface thereof. In the rake face, both sides of a direction which bisects a nose R have an arc shape.

CITATION LIST

Patent Literature

PTL 1: Japanese Patent Laying-Open No. 2003-103407

SUMMARY OF INVENTION

A vibration cutting insert in accordance with one aspect of the present invention includes the following configuration. The vibration cutting insert includes a top surface having a rake face and a breaker face continuous to the rake face; a first side surface continuous to the rake face; a second side surface continuous to the breaker face; and a bottom surface continuous to both of the first side surface and the second side surface. A first ridgeline between the rake face and the first side surface constitutes a cutting edge. In a cross section which includes a bisector of an angle formed between the first ridgeline and a second ridgeline between the breaker face and the second side surface when viewed in a direction from the top surface toward the bottom surface, and which is parallel to the direction from the top surface toward the bottom surface, a rake angle formed between the rake face and a plane parallel to the bottom surface has a positive angle. The angle formed between the first ridgeline and the second ridgeline is an acute angle. The rake face constitutes a cylindrical surface. The breaker face constitutes a flat surface.

BRIEF DESCRIPTION OF DRAWINGS

FIG. 9 is a schematic cross sectional view taken along a line IX-IX in FIG. 5 and viewed in the direction of arrows.

DETAILED DESCRIPTION

Figure 1:
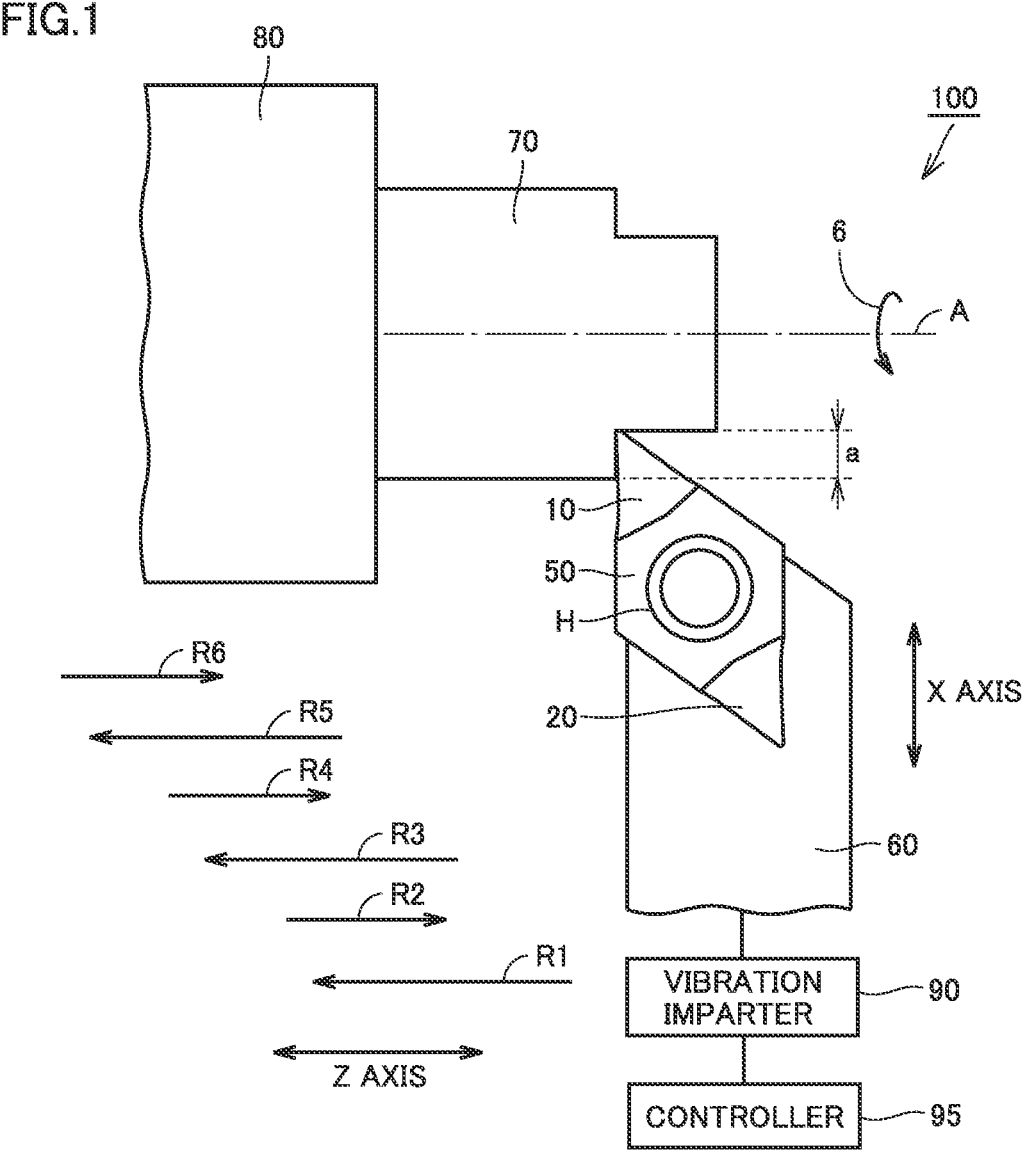
FIG. 1 is a schematic plan view showing a configuration of a vibration cutting device in accordance with the present embodiment.

Problem to be Solved by the Present Disclosure

When a workpiece is cut using the cutting insert disclosed in Japanese Patent Laying-Open No. 2003-103407, however, chip may be caught between the cutting insert and the workpiece.

One aspect of the present invention has been made to solve the aforementioned problem, and an object thereof is to provide a vibration cutting insert capable of suppressing chip from being caught between the vibration cutting insert and a workpiece.

Advantageous Effect of the Present Disclosure

According to one aspect of the present invention, a vibration cutting insert capable of suppressing chip from being caught between the vibration cutting insert and a workpiece can be provided.

Description of Embodiments

First, a summary of an embodiment of the present invention will be described.

(1) A vibration cutting insert in accordance with one aspect of the present invention includes the following configuration. A vibration cutting insert 50 includes: a top surface 10 having a rake face 11 and a breaker face 12 continuous to rake face 11; a first side surface 17 continuous to rake face 11; a second side surface 18 continuous to breaker face 12; and a bottom surface 40 continuous to both of first side surface 17 and second side surface 18. A first ridgeline 13 between rake face 11 and first side surface 17 constitutes a cutting edge. In a cross section 41 which includes a bisector L of an angle θ4 formed between first ridgeline 13 and a second ridgeline 14 between breaker face 12 and second side surface 18 when viewed in a direction from top surface 10 toward bottom surface 40, and which is parallel to the direction from top surface 10 toward bottom surface 40, a rake angle θ1 formed between rake face 11 and a plane S parallel to bottom surface 40 has a positive angle. The angle formed between first ridgeline 13 and second ridgeline 14 is an acute angle. Rake face 11 constitutes a cylindrical surface. Breaker face 12 constitutes a flat surface.

According to the vibration cutting insert in accordance with (1) described above, rake face 11 constitutes a cylindrical surface, and breaker face 12 constitutes a flat surface. Thereby, the flow of chip can be controlled to cause the chip to move in a direction away from a workpiece. Thus, chip can be suppressed from being caught between the vibration cutting insert and the workpiece.

(2) In the vibration cutting insert in accordance with (1) described above, rake angle θ1 may be more than or equal to 23° and less than or equal to 35°. In the case of the vibration cutting insert in accordance with the present embodiment, the cutting edge vibrates along a direction of a rotation axis of the workpiece. Accordingly, the cutting edge repeats contacting the workpiece and separating from the workpiece. In the case of the vibration cutting method, a good biting property is required, when compared with the continuous cutting method. By setting rake angle θ1 to more than or equal to 23°, the cutting edge can have an improved biting property with respect to the workpiece. As a result, the workpiece can be machined without impairing vibration imparted to the vibration cutting insert. Further, by setting rake angle θ1 to less than or equal to 35°, a reduction in the strength of the vibration cutting insert can be suppressed.

(3) In the vibration cutting insert in accordance with (1) or (2) described above, an angle θ2 formed between breaker face 12 and plane S parallel to bottom surface 40 in a cross section 42 perpendicular to bisector L may be more than or equal to 30° and less than or equal to 50°. By setting angle θ2 to more than or equal to 30°, chip slides over the breaker face, which can suppress the flow of chip from becoming difficult to be controlled. By setting angle θ2 to less than or equal to 50°, an increase in cutting resistance can be suppressed.

(4) In the vibration cutting insert in accordance with any of (1) to (3) described above, when viewed from bisector L, a boundary line 15 between rake face 11 and breaker face 12 may be located opposite to first ridgeline 13. Thereby, the flow of chip can be effectively controlled to cause the chip to move in the direction away from the workpiece.

(5) In the vibration cutting insert in accordance with (4) described above, when viewed in the direction from top surface 10 toward bottom surface 40, an angle θ3 formed between boundary line 15 and first ridgeline 13 may be within ±20% of half of angle θ4 formed between first ridgeline 13 and second ridgeline 14. Thereby, the flow of chip can be effectively controlled to cause the chip to move in the direction away from the workpiece.

(6) In the vibration cutting insert in accordance with (4) described above, when viewed in the direction from top surface 10 toward bottom surface 40, a distance b between boundary line 15 and bisector L may be more than or equal to 0.2 mm and less than or equal to 0.3 mm. By setting distance b to more than or equal to 0.2 mm, a large rake face can be secured, and thus the sharpness of the cutting edge can be suppressed from being impaired. By setting distance b to less than or equal to 0.3 mm, the flow of chip can be effectively controlled to cause the chip to move in the direction away from the workpiece.

(7) In the vibration cutting insert in accordance with any of (1) to (6) described above, rake face 11 may have a radius of curvature of more than or equal to 3 mm and less than or equal to 6 mm in cross section 42 perpendicular to bisector L.

(8) In the vibration cutting insert in accordance with any of (1) to (7) described above, angle θ4 formed between first ridgeline 13 and second ridgeline 14 may be less than or equal to 80°.

Details of Embodiment of the Present Invention

Hereinafter, details of the embodiment of the present invention will be described with reference to the drawings. It should be noted that identical or corresponding parts in the drawings below will be designated by the same reference numerals, and the description thereof will not be repeated.

First, a configuration of a vibration cutting device 100 in accordance with the present embodiment will be described.

As shown in FIG. 1, vibration cutting device 100 in accordance with the present embodiment mainly has a cutting tool holder 60, a workpiece holder 80, a vibration imparter 90, and a controller 95. Cutting tool holder 60 is configured to hold vibration cutting insert 50 for cutting a workpiece 70. Workpiece holder 80 is configured to hold workpiece 70. Workpiece holder 80 has a chuck, for example. Workpiece holder 80 is configured to be rotatable about a rotation axis A. Thereby, the workpiece held by workpiece holder 80 rotates about rotation axis A in a rotation direction 6. Workpiece holder 80 is configured to be movable along a Z axis parallel to rotation axis A. Cutting tool holder 60 is configured to be movable along an X axis perpendicular to the Z axis parallel to rotation axis A.

Vibration imparter 90 is configured to relatively vibrate workpiece 70 and vibration cutting insert 50. Vibration imparter 90 is configured to vibrate cutting tool holder 60 such that vibration cutting insert 50 vibrates along a direction parallel to rotation axis A, for example. Vibration imparter 90 may include a vibration motor which is movable in the direction parallel to rotation axis A, for example. Vibration imparter 90 imparts vibration to cutting tool holder 60, for example. A low frequency is a frequency of more than or equal to 25 Hz and less than or equal to 1000 Hz, for example.

Controller 95 is configured to control the operation of vibration imparter 90. Controller 95 is configured to control the frequency, amplitude, and the like of the vibration of vibration imparter 90, for example. Controller 95 is configured to control the operation of vibration imparter 90 in synchronization with the number of rotations of workpiece holder 80, for example. Controller 95 may be configured to control the operation of vibration imparter 90 in synchronization with the feed rate per unit time of cutting tool holder 60, for example.

As described above, vibration cutting device 100 in accordance with the present embodiment mainly has cutting tool holder 60, workpiece holder 80, vibration imparter 90, and controller 95, and is configured to perform a vibration cutting method described below. It should be noted that, although the above embodiment describes a case where vibration imparter 90 is configured to vibrate cutting tool holder 60 along the Z axis, the present invention is not limited to this configuration. Vibration imparter 90 only has to be configured to relatively vibrate workpiece 70 and vibration cutting insert 50, and may be configured to vibrate workpiece holder 80 along the Z axis, for example.

Next, the vibration cutting method in accordance with the present embodiment will be described.

Figure 2:
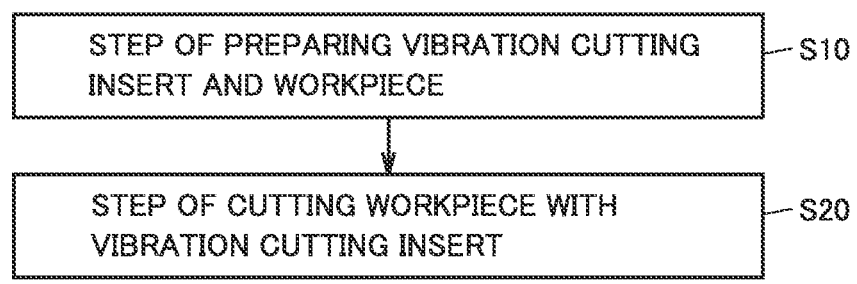
FIG. 2 is a flowchart schematically showing a vibration cutting method in accordance with the present embodiment.

First, the step of preparing the vibration cutting insert and the workpiece (S10: FIG. 2) is performed. Specifically, workpiece 70 is attached to workpiece holder 80. Workpiece 70 is held by the chuck, for example. While workpiece 70 is made of stainless steel (such as SUS304, SUS316), for example, the material therefor is not limited to stainless steel. Workpiece 70 may be made of aluminum, steel, or the like, for example. Vibration cutting insert 50 is attached to cutting tool holder 60. Vibration cutting insert 50 is fixed to cutting tool holder 60, for example, by inserting an attaching screw (not shown) into a through hole H. A detailed configuration of vibration cutting insert 50 will be described later.

Subsequently, the step of cutting the workpiece with the vibration cutting insert (S20: FIG. 2) is performed. By rotating workpiece holder 80 using a motor (not shown) or the like, for example, workpiece 70 rotates about rotation axis A. By adjusting the position of cutting tool holder 60 in the X-axis direction, the position of vibration cutting insert 50 with respect to workpiece 70 is adjusted. Workpiece 70 moves closer to vibration cutting insert 50 along the Z-axis direction. Cutting of workpiece 70 is started when workpiece 70 contacts the cutting edge of vibration cutting insert 50. In the step of cutting the workpiece with the vibration cutting insert, vibration is imparted to cutting tool holder 60 by vibration imparter 90, such that vibration cutting insert 50 vibrates along the direction parallel to rotation axis A. A length a of the cutting edge in contact with workpiece 70 is 3 mm, for example. The feed rate of vibration cutting insert 50 is determined in synchronization with the number of rotations of workpiece 70.

Figure 3:
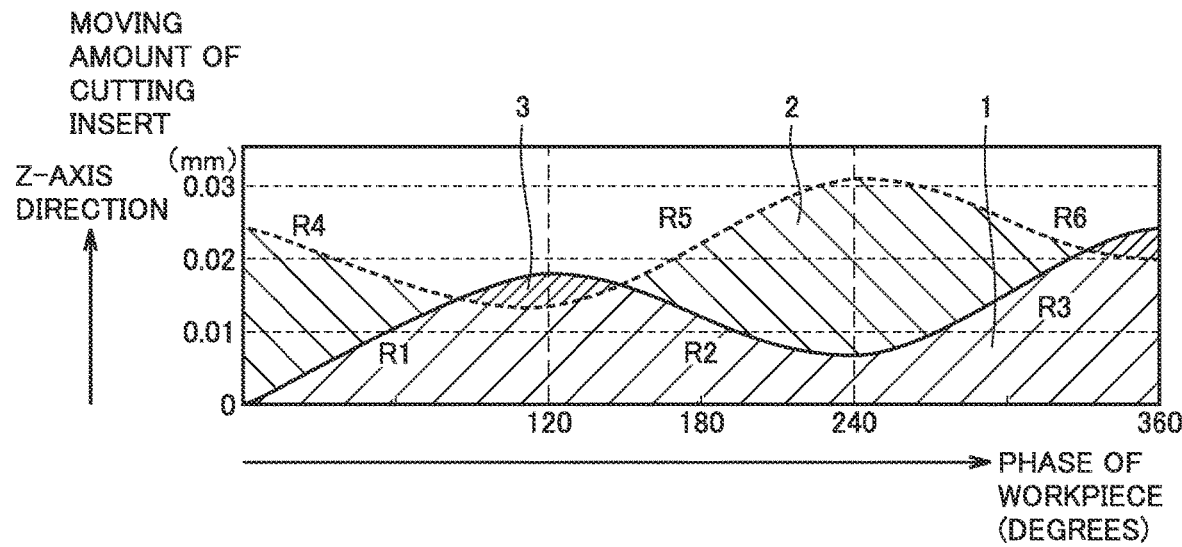
FIG. 3 is a view showing the relation between the moving amount of a vibration cutting insert and the phase of a workpiece.
Figure 4:
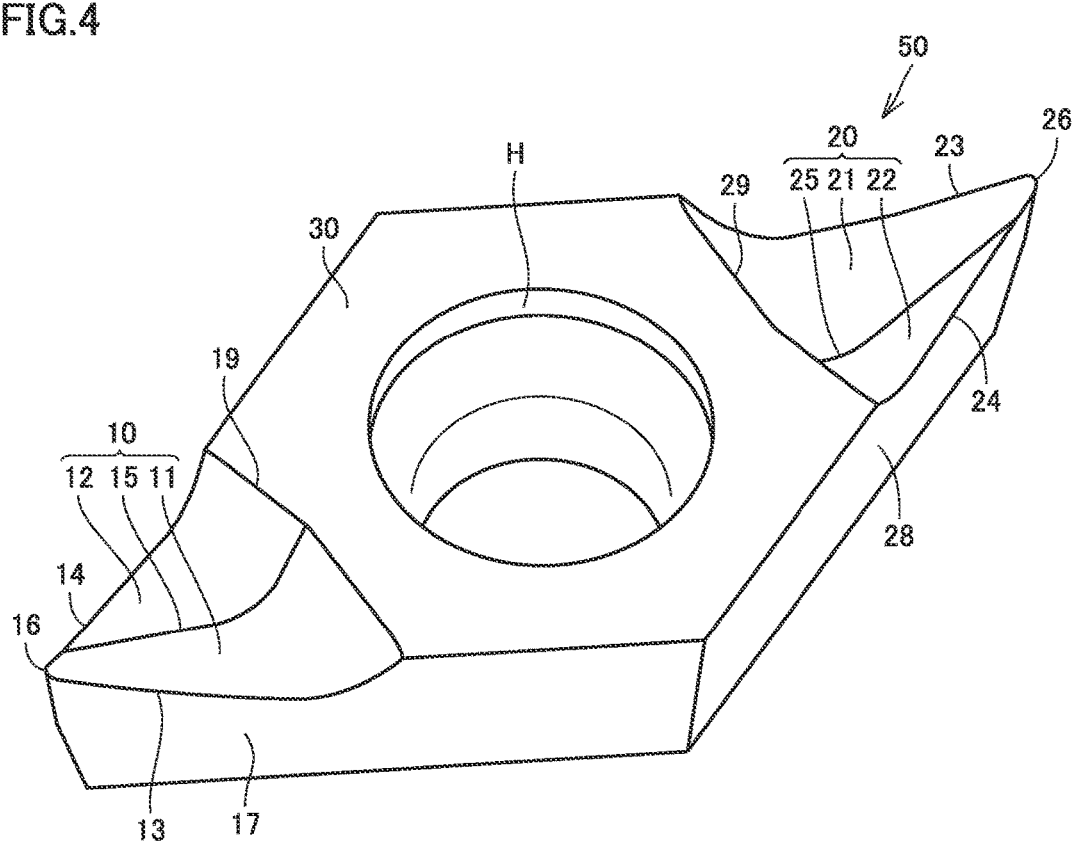
FIG. 4 is a schematic perspective view showing a configuration of the vibration cutting insert.

FIG. 3 shows the relation between the phase of rotation of workpiece 70 and the moving amount of the vibration cutting insert in the Z-axis direction. In FIG. 3, a region R1, a region R2, and a region R3 are a region 1 where workpiece 70 is cut in a first rotation. A region R4, a region R5, and a region R6 are a region 2 where workpiece 70 is cut in a second rotation. In region R1, while workpiece 70 is rotating from 0° to 120°, vibration cutting insert 50 cuts workpiece 70 as it moves closer to workpiece 70 along the Z-axis direction. In region R2, while workpiece 70 is rotating from 120° to 240°, vibration cutting insert 50 cuts workpiece 70 as it moves further away from workpiece 70 along the Z-axis direction. In region R3, while workpiece 70 is rotating from 240° to 360°, vibration cutting insert 50 cuts workpiece 70 as it moves closer to workpiece 70 along the Z-axis direction.

Similarly, in region R4, while workpiece 70 is rotating from 0° to 120°, vibration cutting insert 50 cuts workpiece 70 as it moves further away from workpiece 70 along the Z-axis direction. In region R5, while workpiece 70 is rotating from 120° to 240°, vibration cutting insert 50 cuts workpiece 70 as it moves closer to workpiece 70 along the Z-axis direction. In region R6, while workpiece 70 is rotating from 240° to 360°, vibration cutting insert 50 cuts workpiece 70 as it moves further away from workpiece 70 along the Z-axis direction. It should be noted that a latter half portion of region R4, a first half portion of region R5, and a latter half portion of region R6 are a non-contact rotation region 3 where the moving amount of vibration cutting insert 50 in the second rotation is smaller than the moving amount of vibration cutting insert 50 in the first rotation. In non-contact rotation region 3, the cutting edge of vibration cutting insert 50 does not contact workpiece 70, and thus cutting of workpiece 70 is not substantially performed. Accordingly, no chip is produced in non-contact rotation region 3.

Next, a configuration of vibration cutting insert 50 in accordance with the present embodiment will be described.

As shown in FIGS. 4, 5, 6, and 7, vibration cutting insert 50 in accordance with the present embodiment mainly has a first top surface 10, a second top surface 20, an upper surface 30, bottom surface 40, first side surface 17, second side surface 18, a third side surface 27, and a fourth side surface 28. When viewed in the direction from top surface 10 toward bottom surface 40, vibration cutting insert 50 has a substantially rhombic shape. Vibration cutting insert 50 is provided with through hole H opening in both of upper surface 30 and bottom surface 40. Upper surface 30 is substantially parallel to bottom surface 40. When viewed from through hole H, second top surface 20 is located opposite to first top surface 10. The shape of first top surface 10 and the shape of second top surface 20 are substantially rotationally symmetric about the center of through hole H. Bottom surface 40 is a portion in contact with cutting tool holder 60 (see FIG. 1) when vibration cutting insert 50 is attached to cutting tool holder 60.

First top surface 10 has a first rake face 11 and a first breaker face 12. First breaker face 12 is continuous to first rake face 11 along a first boundary line 15. First side surface 17 is continuous to first rake face 11. Second side surface 18 is continuous to first breaker face 12. Bottom surface 40 is continuous to both of first side surface 17 and second side surface 18. First ridgeline 13 between first rake face 11 and first side surface 17 constitutes the cutting edge. Typically, first ridgeline 13 has a length of more than or equal to 1.0 mm and less than or equal to 5.0 mm. The ridgeline between first breaker face 12 and second side surface 18 is defined as second ridgeline 14. A first apex 16 at which first ridgeline 13 is continuous to second ridgeline 14 may also constitute the cutting edge. First top surface 10 is continuous to upper surface 30 along a third boundary portion 19. First top surface 10 is a region surrounded by first ridgeline 13, second ridgeline 14, and third boundary portion 19.

Similarly, second top surface 20 has a second rake face 21 and a second breaker face 22. Second breaker face 22 is continuous to second rake face 21 along a second boundary line 25. Third side surface 27 is continuous to second rake face 21. Fourth side surface 28 is continuous to second breaker face 22. Bottom surface 40 is continuous to both of third side surface 27 and fourth side surface 28. A third ridgeline 23 between second rake face 21 and third side surface 27 constitutes a cutting edge. A ridgeline between second breaker face 22 and fourth side surface 28 is defined as a fourth ridgeline 24. A second apex 26 at which third ridgeline 23 is continuous to fourth ridgeline 24 may also constitute the cutting edge. Second top surface 20 is continuous to upper surface 30 along a fourth boundary portion 29. Second top surface 20 is a region surrounded by third ridgeline 23, fourth ridgeline 24, and fourth boundary portion 29.

Figure 5:
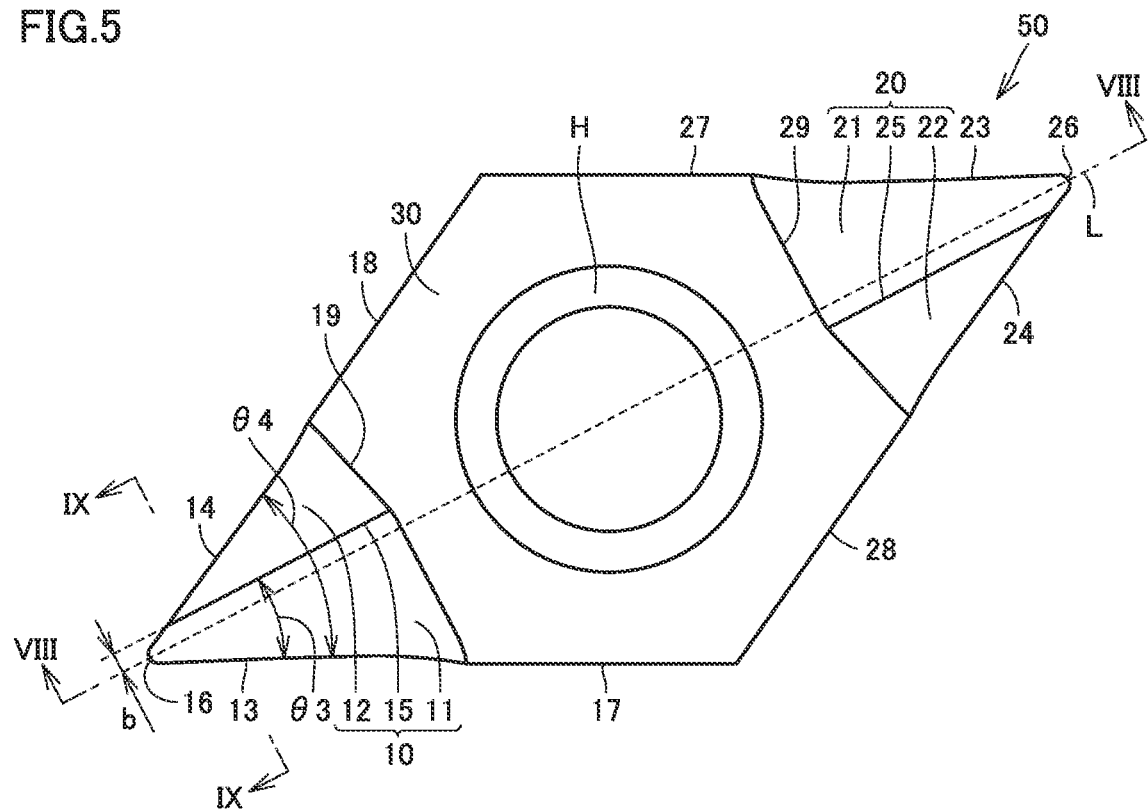
FIG. 5 is a schematic plan view showing the configuration of the vibration cutting insert.
Figure 6:
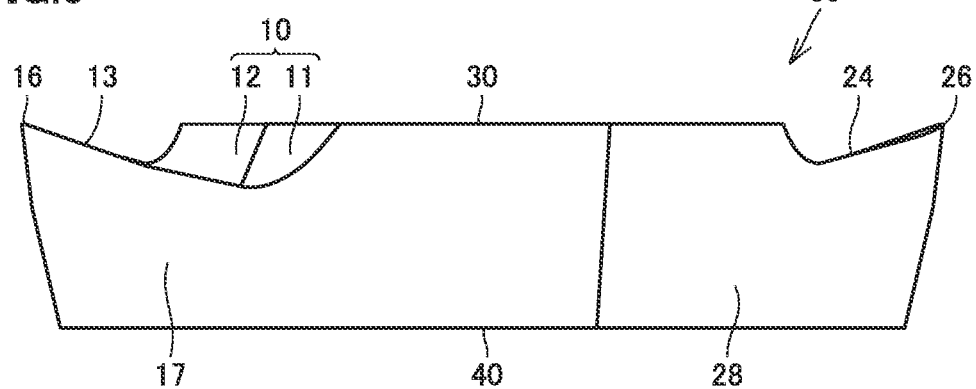
FIG. 6 is a schematic front view showing the configuration of the vibration cutting insert.
Figure 7:
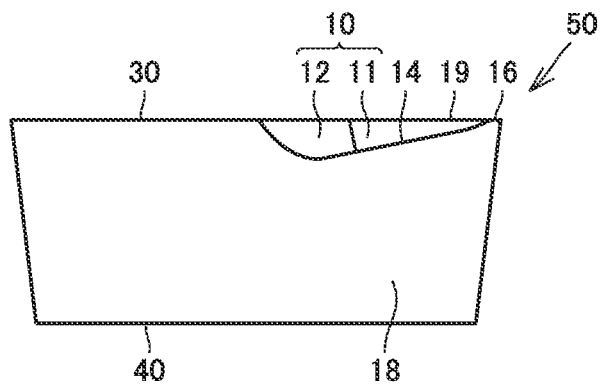
FIG. 7 is a schematic left side-surface view showing the configuration of the vibration cutting insert.

As shown in FIG. 5, when viewed in the direction from top surface 10 toward bottom surface 40, angle θ4 formed between first ridgeline 13 and second ridgeline 14 between first breaker face 12 and second side surface 18 is an acute angle. When viewed in the direction from top surface 10 toward bottom surface 40, angle θ4 formed between first ridgeline 13 and second ridgeline 14 is, for example, less than or equal to 80°, preferably less than or equal to 60°, and more preferably less than or equal to 55°. Angle θ4 formed between first ridgeline 13 and second ridgeline 14 is substantially the same as an angle formed between third ridgeline 23 and fourth ridgeline 24.

As shown in FIG. 5, when viewed in the direction from top surface 10 toward bottom surface 40, angle θ3 formed between first boundary line 15 and first ridgeline 13 may be within ±20% of half of angle θ4 formed between first ridgeline 13 and second ridgeline 14. For example, when angle θ4 formed between first ridgeline 13 and second ridgeline 14 is 80°, angle θ3 formed between first boundary line 15 and first ridgeline 13 is more than or equal to 32° and less than or equal to 48°. When angle θ4 is 55°, angle θ3 is more than or equal to 22° and less than or equal to 33°. When angle θ4 is 35°, angle θ3 is more than or equal to 14° and less than or equal to 21°.

As shown in FIG. 5, when viewed from bisector L of angle θ4 formed between first ridgeline 13 and second ridgeline 14, first boundary line 15 between first rake face 11 and first breaker face 12 may be located opposite to first ridgeline 13. In other words, bisector L is located between first ridgeline 13 and first boundary line 15 between first rake face 11 and first breaker face 12. Bisector L is parallel to upper surface 30 and bottom surface 40, for example. First boundary line 15 is spaced from first ridgeline 13, and is in contact with second ridgeline 14. When viewed in the direction from top surface 10 toward bottom surface 40, distance b between first boundary line 15 and bisector L (the shortest distance) is, for example, more than or equal to 0.2 mm and less than or equal to 0.3 mm. Distance b is preferably more than or equal to 0.20 mm and less than or equal to 0.27 mm, and more preferably more than or equal to 0.20 mm and less than or equal to 0.24 mm.

Figure 8:
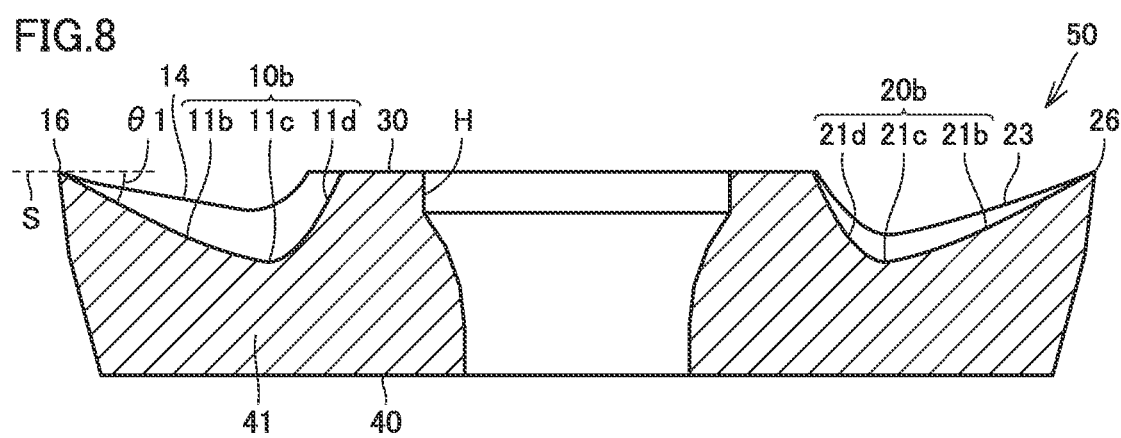
FIG. 8 is a schematic cross sectional view taken along a line VIII-VIII in FIG. 5 and viewed in the direction of arrows.

As shown in FIG. 8, in cross section 41 which includes bisector L of angle θ4 formed between first ridgeline 13 and second ridgeline 14, and which is parallel to the direction from first top surface 10 toward bottom surface 40, rake angle θ1 formed between first rake face 11 and plane S parallel to bottom surface 40 has a positive angle. That is, in cross section 41, first rake face 11 is inclined toward bottom surface 40 with respect to plane S which passes through first apex 16 and is parallel to bottom surface 40. A first rake angle θ1 is, for example, more than or equal to 23° and less than or equal to 35°. Rake angle θ1 is preferably more than or equal to 24° and less than or equal to 30°, and more preferably more than or equal to 25° and less than or equal to 27°.

A line 10b along which cross section 41 intersects with first top surface 10 has a first inclined portion 11b, a first bottom portion 11c, and a second inclined portion 11d. First inclined portion 11b is continuous to first apex 16. Second inclined portion 11d is continuous to upper surface 30. First bottom portion 11c is located between first inclined portion 11b and second inclined portion 11d. From first apex 16 toward through hole H, first inclined portion 11b becomes closer to bottom surface 40. From first apex 16 toward through hole H, second inclined portion 11d becomes further away from bottom surface 40.

Similarly, a line 20b along which cross section 41 intersects with second top surface 20 has a third inclined portion 21b, a second bottom portion 21c, and a fourth inclined portion 21d. Third inclined portion 21b is continuous to second apex 26. Fourth inclined portion 21d is continuous to upper surface 30. Second bottom portion 21c is located between third inclined portion 21b and fourth inclined portion 21d. From second apex 26 toward through hole H, third inclined portion 21b becomes closer to bottom surface 40. From second apex 26 toward through hole H, fourth inclined portion 21d becomes further away from bottom surface 40.

As shown in FIG. 9, rake face 11 constitutes a cylindrical surface. The cylindrical surface is a portion of a cylinder surface. First breaker face 12 constitutes a flat surface. A line 10a along which cross section 42 perpendicular to bisector L intersects with first top surface 10 has an arc portion 11a, a boundary portion 15a, and a linear portion 12a. Arc portion 11a is continuous to linear portion 12a at boundary portion 15a. Arc portion 11a is continuous to first side surface 17 at first ridgeline 13. Linear portion 12a is continuous to second side surface 18 at second ridgeline 14. Cross section 42 is perpendicular to upper surface 30 and bottom surface 40, for example.

As shown in FIG. 9, angle θ2 formed between first breaker face 12 and plane S parallel to bottom surface 40 in cross section 42 perpendicular to bisector L is, for example, more than or equal to 30° and less than or equal to 50°. Angle θ2 is preferably more than or equal to 30° and less than or equal to 40°, and more preferably more than or equal to 30° and less than or equal to 35°. Rake face 11 may have a radius of curvature of more than or equal to 3 mm and less than or equal to 6 mm in cross section 42 perpendicular to bisector L. The radius of curvature of rake face 11 is preferably more than or equal to 3.5 mm and less than or equal to 5 mm, and more preferably more than or equal to 4 mm and less than or equal to 4.5 mm.

Next, the function and effect of the vibration cutting insert in accordance with the present embodiment will be described.

According to vibration cutting insert 50 in accordance with the present embodiment, breaker face 12 constitutes a flat surface. Thereby, the flow of chip can be controlled to cause the chip to move in the direction away from the workpiece. Thus, chip can be suppressed from being caught between vibration cutting insert 50 and workpiece 70.

Further, according to vibration cutting insert 50 in accordance with the present embodiment, rake angle θ1 is more than or equal to 23° and less than or equal to 35°. In the case of the vibration cutting method, the cutting edge vibrates along the direction of the rotation axis of the workpiece. Accordingly, the cutting edge repeats contacting the workpiece and separating from the workpiece. In the case of the vibration cutting method, a good biting property is required, when compared with the continuous cutting method. By setting rake angle θ1 to more than or equal to 23°, the cutting edge can have an improved biting property with respect to the workpiece. As a result, the workpiece can be machined without impairing vibration imparted to the vibration cutting insert. Further, by setting rake angle θ1 to less than or equal to 35°, a reduction in the strength of the vibration cutting insert can be suppressed.

Furthermore, according to vibration cutting insert 50 in accordance with the present embodiment, angle θ2 formed between breaker face 12 and plane S parallel to bottom surface 40 in cross section 42 perpendicular to bisector L is more than or equal to 30° and less than or equal to 50°. By setting angle θ2 to more than or equal to 30°, chip slides over the breaker face, which can suppress the flow of chip from becoming difficult to be controlled. By setting angle θ2 to less than or equal to 50°, an increase in cutting resistance can be suppressed.

Furthermore, according to vibration cutting insert 50 in accordance with the present embodiment, when viewed from bisector L, boundary line 15 between rake face 11 and breaker face 12 is located opposite to first ridgeline 13. Thereby, the flow of chip can be effectively controlled to cause the chip to move in the direction away from the workpiece.

Furthermore, according to vibration cutting insert 50 in accordance with the present embodiment, when viewed in the direction from top surface 10 toward bottom surface 40, angle θ3 formed between boundary line 15 and first ridgeline 13 is within ±20% of half of angle θ4 formed between first ridgeline 13 and second ridgeline 14. Thereby, the flow of chip can be effectively controlled to cause the chip to move in the direction away from the workpiece.

Furthermore, according to vibration cutting insert 50 in accordance with the present embodiment, when viewed in the direction from top surface 10 toward bottom surface 40, distance b between boundary line 15 and bisector L is more than or equal to 0.2 mm and less than or equal to 0.3 mm. By setting distance b to more than or equal to 0.2 mm, the sharpness of the cutting edge can be suppressed from being impaired. By setting distance b to less than or equal to 0.3 mm, the flow of chip can be effectively controlled to cause the chip to move in the direction away from the workpiece.

Furthermore, according to vibration cutting insert 50 in accordance with the present embodiment, rake face 11 has a radius of curvature of more than or equal to 3 mm and less than or equal to 6 mm in cross section 42 perpendicular to bisector L.

Furthermore, according to vibration cutting insert 50 in accordance with the present embodiment, angle θ4 formed between first ridgeline 13 and second ridgeline 14 is less than or equal to 80°.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: region cut in the first rotation; 2: region cut in the second rotation; 3: non-contact rotation region; 10: top surface (first top surface); 10a, 10b, 20b: line; 11: rake face (first rake face); 11a: arc portion; 11b: first inclined portion; 11c: first bottom portion; 11d: second inclined portion; 12: breaker face (first breaker face); 12a: linear portion; 13: first ridgeline; 14: second ridgeline; 15: first boundary line (boundary line); 15a: boundary portion; 16: first apex; 17: first side surface; 18: second side surface; 19: third boundary portion; 20: second top surface; 21: second rake face; 21b: third inclined portion; 21c: second bottom portion; 21d: fourth inclined portion; 22: second breaker face; 23: third ridgeline; 24: fourth ridgeline; 25: second boundary line; 26: second apex; 27: third side surface; 28: fourth side surface; 29: fourth boundary portion; 30: upper surface; 40: bottom surface; 41, 42: cross section; 50: vibration cutting insert; 60: cutting tool holder; 70: workpiece; 80: workpiece holder; 90: vibration imparter; 95: controller; 100: vibration cutting device; A: rotation axis; H: through hole; L: bisector; R1, R2, R3, R4, R5, R6: region; a: length; b: distance.

The invention claimed is:

1. A vibration cutting insert comprising:
    a top surface having a rake face and a breaker face continuous to the rake face;
    a first side surface continuous to the rake face;
    a second side surface continuous to the breaker face; and
    a bottom surface continuous to both of the first side surface and the second side surface, wherein
    a first ridgeline between the rake face and the first side surface constitutes a cutting edge,
    in a cross section which includes a bisector of an angle formed between the first ridgeline and a second ridgeline between the breaker face and the second side surface when viewed in a direction from the top surface toward the bottom surface, the cross section being perpendicular to the bottom surface, a rake angle formed between the rake face and a plane parallel to the bottom surface has a positive angle,
    the angle formed between the first ridgeline and the second ridgeline is an acute angle,
    in a cross section perpendicular to the bisector, the rake face has an arc portion and the breaker face has a linear portion,
    the bisector is located between the first ridgeline and a boundary line between the rake face and the breaker face,
    the bisector does not intersect with the boundary line, and
    the bisector extends in a direction that divides in half the angle formed between the first ridgeline and the second ridgeline.

2. The vibration cutting insert according to claim 1, wherein the rake angle is more than or equal to 23° and less than or equal to 35°.

3. The vibration cutting insert according to claim 1, wherein an angle of the breaker face taken from the plane parallel to the bottom surface in the cross section perpendicular to the bisector is more than or equal to 30° and less than or equal to 50°.

4. The vibration cutting insert according to claim 1, wherein, when viewed from the bisector, the boundary line between the rake face and the breaker face is located opposite to the first ridgeline.

5. The vibration cutting insert according to claim 4, wherein, when viewed in the direction from the top surface toward the bottom surface, an angle formed between the boundary line and the first ridgeline is within ±20% of half of the angle formed between the first ridgeline and the second ridgeline.

6. The vibration cutting insert according to claim 4, wherein, when viewed in the direction from the top surface toward the bottom surface, a distance between the boundary line and the bisector is more than or equal to 0.2 mm and less than or equal to 0.3 mm.

7. The vibration cutting insert according to claim 1, wherein the rake face has a radius of curvature of more than or equal to 3 mm and less than or equal to 6 mm in the cross section perpendicular to the bisector.

8. The vibration cutting insert according to claim 1, wherein the angle formed between the first ridgeline and the second ridgeline is less than or equal to 80°.

9. The vibration cutting insert according to claim 1, wherein the bisector extends from a first apex of the vibration cutting insert to a second apex of the vibration cutting insert opposite the first apex, wherein the first ridgeline is continuous to the second ridgeline at the first apex, and wherein a third ridgeline of the vibration cutting insert is continuous to a fourth ridgeline of the vibration cutting insert at the second apex.

10. The vibration cutting insert according to claim 1, wherein the bisector is parallel to the boundary line.

* * * * *